United States Patent
Lin et al.

(10) Patent No.: US 10,274,925 B2
(45) Date of Patent: Apr. 30, 2019

(54) METHOD AND DEVICE FOR GENERATING CONTROL COMMAND

(71) Applicant: TECO ELECTRIC & MACHINERY CO., LTD., Taipei (TW)

(72) Inventors: Chia-Jen Lin, Taipei (TW); Feng-Chieh Lin, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 0 days.

(21) Appl. No.: 15/654,060

(22) Filed: Jul. 19, 2017

(65) Prior Publication Data

US 2018/0364675 A1     Dec. 20, 2018

(30) Foreign Application Priority Data

Jun. 16, 2017   (TW) .............................. 106120233 A

(51) Int. Cl.
   *G05B 11/01*     (2006.01)
   *G05B 19/29*     (2006.01)
   *G05B 19/33*     (2006.01)

(52) U.S. Cl.
   CPC .......... *G05B 19/298* (2013.01); *G05B 11/011* (2013.01); *G05B 19/33* (2013.01)

(58) Field of Classification Search
   CPC ...... G05B 19/298; G05B 19/33; G05B 11/011
   USPC .......................................................... 700/56
   See application file for complete search history.

(56) References Cited

U.S. PATENT DOCUMENTS

| 2008/0165281 A1* | 7/2008 | Davis ................... G11B 27/322 348/521 |
| 2013/0050241 A1* | 2/2013 | Hirohama ............... G06T 13/40 345/589 |
| 2013/0238048 A1* | 9/2013 | Almendinger ....... A61N 1/3787 607/40 |

* cited by examiner

*Primary Examiner* — Ziaul Karim
(74) *Attorney, Agent, or Firm* — Muncy, Geissler, Olds & Lowe, P.C.

(57) ABSTRACT

A method and a device are used to generate a control command. A resolution base value and a resolution-tick corresponding function are created. A first operation frequency value, a minimal tick value and a resolution value are received to calculate a resolution ratio and a second operation frequency. A conversional tick value is calculated. If or not the conversional tick value is greater than or equal to the minimal tick value is determined. If the conversion tick value is smaller than the minimal tick value, the minimal tick value, the conversional tick value and the second operation frequency are used to calculate a conversional operation frequency. A conversional resolution ratio is calculated according to the first operation frequency and the conversional operation frequency, and also a modified tick value is calculated. The control command is output according to the modified tick value, the first operation frequency and the conversion operation frequency.

12 Claims, 3 Drawing Sheets

METHOD AND DEVICE FOR GENERATING CONTROL COMMAND

This application claims the benefit of Taiwan Patent Application Serial No. 106120233, filed Jun. 16, 2017, the subject matter of which is incorporated herein by reference.

BACKGROUND OF THE INVENTION

1. Field of the Invention

The invention relates to a method and a device for generating a control command, and more particularly to the method and the device for generating a control command that a judgment whether or not a conversional tick value is greater than or equal to a minimal tick value is implemented to calculate correspondingly a conversional operation frequency and a modified tick value and further to output a respective control command to a drive device.

2. Description of the Prior Art

Automatic controls and detections of an analytic servo system of a motor are conventionally created from a cluster of input rotational loops, speed commands and sinusoidal frequencies generated by digital programmable system control programs. Also, hardware digital/analog interface link drivers are introduced to transmit data, including parameters and commands, to perform related servo setups, as input commands to feed the servo system. Generally, digital pulsation commands are used to detect response and precision of controls upon positions and velocities of the system. Practically, the aforesaid manipulations shall integrate feedback resolutions of the servo system and adjust frequencies of corresponding pulsation commands, such that the servo system can receive correct commands in positions and velocities so as to precisely control the motor.

In the art, controls and analysis of the motor are conducted by special devices. For example, a functional command generator is usually applied as a major control device. Generally speaking, on calibrating resolution differences fed back by corresponding encoders respective to the servo system, multiple and versatile testing upon parameters of electric gears are usually necessary. Thus, only an automatic testing and analysis system can meet the task. In addition, parameter adjustments of the pulsation commands generated by the conventional functional command generator can only be carried out and inspected manually.

Hence, to the art, if the response analysis and controls toward any individual hardware/software design change of the system are performed by the conventional functional command generator during the development and/or sale of the product, then some engineering errors would be inevitable, from which maintenance time and labors for debugging will be prolonged definitely.

SUMMARY OF THE INVENTION

In view that, in case of the conventional functional command generator being introduced to perform the response analysis and controls at any individual hardware/software design change of the system during the development and/or sale of the product, some inevitable engineering errors would be expected, and additional maintenance time and labors for debugging would be inevitable. Accordingly, it is an object of the present invention to provide a control-command generating method applied to a command-generating device so as to generate a control command for driving a drive device of a motor. Firstly, a resolution base value and a resolution-tick corresponding function are created. Then, a first operation frequency corresponding to the drive device, a minimal tick value corresponding to the command-generating device, and a resolution value corresponding to the drive device are received.

Then, base on the resolution value and the resolution base value to calculate a resolution ratio, and further base on the resolution ratio and the first operation frequency to calculate a second operation frequency corresponding to the command-generating device. Further, input the resolution ratio to the resolution-tick corresponding function to derive a conversional tick value. Thereafter, judge whether or not the conversional tick value is greater than or equal to the minimal tick value. Upon that a judgment is negative, the minimal tick value, the conversional tick value and the second operation frequency are used to calculate a conversional operation frequency.

Then, base on the first operation frequency and the conversional operation frequency to calculate a conversional resolution ratio, and further input the conversional resolution ratio to the resolution-tick corresponding function so as to calculate a modified tick value. Finally, base on the modified tick value, the first operation frequency and the conversional operation frequency to output the control command.

In one embodiment of the present invention, upon obtaining a positive judgment on judging whether or not the conversional tick value is greater than or equal to the minimal tick value, a step of basing on the conversional tick value, the first operation frequency and the second operation frequency to output the control command is included.

In one embodiment of the present invention, the control command is an analog signal or a digital signal.

In one embodiment of the present invention, the resolution-tick corresponding function is an exponential function.

In one embodiment of the present invention, while in basing the resolution value and the resolution base value to calculate the resolution ratio, a divider is applied to divide the resolution value by the resolution base value so as to generate the resolution ratio. In addition, while in using the resolution ratio and the first operation frequency to calculate the second operation frequency corresponding to the command-generating device, the divider is applied again to divide the first operation frequency by the resolution ratio so as to generate the second operation frequency.

In one embodiment of the present invention, while in using the minimal tick value, the conversional tick value and the second operation frequency to calculate the conversional operation frequency, a divider is applied to divide the minimal tick value by the conversional tick value so as to generate a calculated ratio, and a multiplier is applied to multiply the second operation frequency by the calculated ratio so as to generate the conversional operation frequency.

In one embodiment of the present invention, while in basing on the first operation frequency and the conversional operation frequency to calculate the conversional resolution ratio, a divider is applied to divide the first operation frequency by the conversional operation frequency so as to generate the conversional resolution ratio.

In another aspect of the present invention, a command-generating device is provided to generate a control command for driving a drive device of a motor. The command-generating device of the motor includes a memory module, a setup module, a calculation module, a determination module and a command-generating module. The memory module is to store a resolution base value and a resolution-tick corresponding function. The setup module is to receive and transmit a first operation frequency corresponding to the drive device, a minimal tick value, and a resolution value corresponding to the drive device.

The calculation module electrically coupled with the memory module and the setup module is to base on the resolution value and the resolution base value to calculate a resolution ratio, to use the resolution ratio and the first operation frequency to calculate a second operation frequency corresponding to the command-generating device, and to input the resolution ratio to the resolution-tick corresponding function so as to calculate and further transmit a conversional tick value. The determination module electrically coupled with the setup module and the calculation module is to receive the conversional tick value and to judge whether or not the conversional tick value is greater than or equal to the minimal tick value. Upon a negative judgment, a judgment signal is transmitted to the calculation module. In addition, the command-generating module is electrically coupled with the calculation module.

In the present invention, as the calculation module receives the judgment signal, the minimal tick value, the conversional tick value and the second operation frequency are used to calculate a conversional operation frequency, and the first operation frequency and the conversional operation frequency are used to calculate a conversional resolution ratio further to be inputted to the resolution-tick corresponding function so as to calculate a modified tick value further to be transmitted to the command-generating module, such that the command-generating module can base on the modified tick value, the first operation frequency and the conversional operation frequency to output the control command.

In one embodiment of the present invention, as the determination module judges that the conversional tick value is greater than or equal to the minimal tick value, the calculation module is triggered to transmit the conversional tick value, the first operation frequency and the second operation frequency to the command-generating module, such that the command-generating module can base on the conversional tick value, the first operation frequency and the second operation frequency to output the control command.

In one embodiment of the present invention, the control command is an analog signal or a digital signal.

In one embodiment of the present invention, the resolution-tick corresponding function is an exponential function.

In one embodiment of the present invention, the calculation module includes a divider or a multiplier.

As described above, in the method and the device for generating the control command provided by the present invention, the divider is applied to divide the resolution value by the resolution base value so as to generate the corresponding resolution ratio, and the divider is further applied to divide the first operation frequency by the resolution ratio so as thereby to generate the corresponding second operation frequency. Then, the calculation module inputs the resolution ratio to the resolution-tick corresponding function so as to calculate a corresponding conversional tick value. Then, the determination module is introduced to judge whether or not the conversional tick value is greater than or equal to the minimal tick value.

If the judgment is positive, then the command-generating module would base on the conversional tick value, the first operation frequency and the second operation frequency to output the corresponding control command to the drive device so as to control the motor.

If the judgment is negative, then the divider is applied to divide the minimal tick value by the conversional tick value so as to generate the calculated ratio, and then the multiplier is applied to multiply the second operation frequency by the calculated ratio so as to generate the conversional operation frequency. Then, the divider is applied again to divide the first operation frequency by the conversional operation frequency so as to generate the conversional resolution ratio. Finally, the command-generating module is applied to base on the modified tick value, the first operation frequency and the conversional operation frequency to output the corresponding control command to the drive device for controlling the motor.

In comparison to the prior art, the preferred method and the preferred device for generating the control command provided by the present invention apply the calculation module to calculate the conversional tick value, and apply the determination module to judge whether or not the conversional tick value is greater than or equal to the minimal tick value. As the conversional tick value is smaller than the minimal tick value, the calculation module is introduced to calculate the conversional resolution ratio, and the command-generating module is used to output the corresponding control command.

Since the present invention provides a method and a device for generating a control command able to automatically perform the analysis of control response, thus the conventional human effort upon the functional command generator and the related analysis can be waived. Thereupon, the inevitable engineering errors in the art would be avoided, and the problem in additional maintenance time and labors for debugging would be substantially resolved.

All these objects are achieved by the method and the device for generating a control command described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method and a device for generating a control command. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
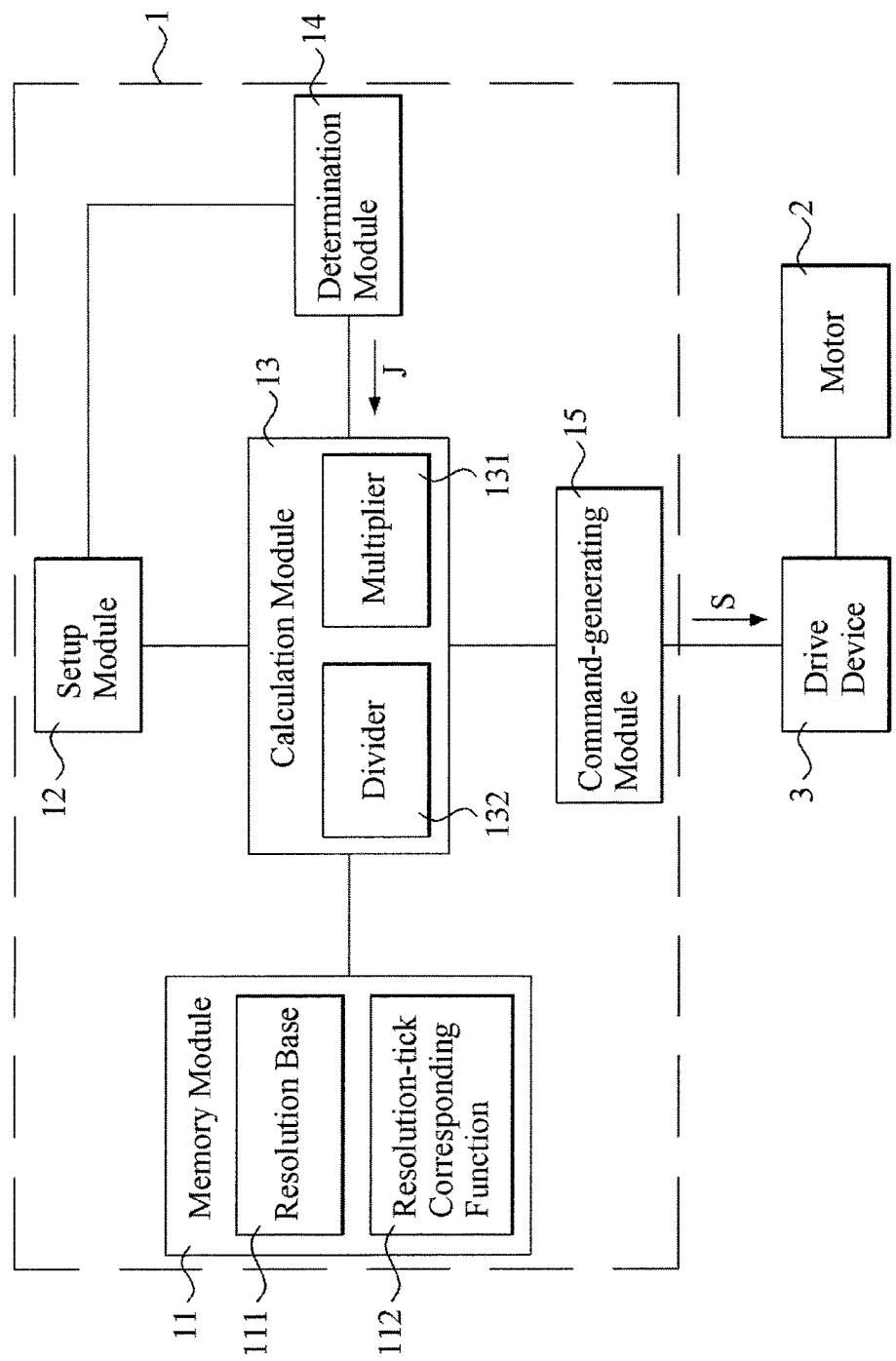
FIG. 1 is a schematic block view of a preferred embodiment of the command-generating device in accordance with the present invention.

Referring now to FIG. 1, a schematic block view of a preferred embodiment of the command-generating device in accordance with the present invention is shown. In this embodiment, the command-generating device 1 of the present invention includes a memory module 11, a setup module 12, a calculation module 13, a determination module 14 and a command-generating module 15. Also, the command-generating device 1 can be mounted in, but not limited to, a field programmable gate array (FPGA).

The memory module 11 is to store a resolution base value 111 and a resolution-tick corresponding function 112. In the present invention, the memory module 11 can be, but not limited to, a hard disk drive (HDD), a solid-state disk (SSD), a read-only memory (ROM), a random access memory (RAM), a flash memory or any software with a similar function. In addition, the resolution-tick corresponding function 112 can be, but not limited to, an exponential function.

In this embodiment, the setup module 12 is mounted in the FPGA. However, in some other embodiments, the setup module can be, but not limited to, a central processor, a micro processor, a digital signal processor or any software with a similar function. The calculation module 13 electrically coupled with the memory module 11 and the setup module 12 includes a divider 132 and a multiplier 131. In this embodiment, the calculation module 13 is mounted in the FPGA.

The determination module 14 is electrically coupled with the setup module 12 and the calculation module 13. In this embodiment, the determination module 14 is mounted in the FPGA. However, in some other embodiments, the determination module 14 can be, but not limited to, a central processor, a micro processor, a digital signal processor or any software with a similar function. The command-generating module 15 is electrically coupled with the calculation module 13. In this embodiment, the command-generating module 15 is mounted in the FPGA. However, in some other embodiments, the command-generating module 15 can be, but not limited to, a central processor, a micro processor, a digital signal processor or any software with a similar function.

The command-generating device 1 provided in this preferred embodiment of the present invention is applied to generate a control command S, and the control command S is further transmitted to a drive device 3 for driving a motor 2. In this embodiment, the control command S can be, but not limited to, an analog signal or a digital signal. The setup module 12 is to receive and transmit a first operation frequency corresponding to the drive device 3, a minimal tick value (min_tick) and a resolution value corresponding to the drive device 3. In the present invention, the first operation frequency can be an electric gear ratio, and the resolution value can be an encoder resolution.

The calculation module 13 is to base on the resolution value and the resolution base value 111 to derive a resolution ratio (encoder resolution/resolution base value), and further to use this resolution ratio and the first operation frequency to obtain a second operation frequency corresponding to the command-generating device 1 and transmit the resolution ratio to the resolution-tick corresponding function 112 as an input, such that a conversional tick value can be derived and forwarded. In the present invention, the resolution ratio can be a ratio of the encoder resolution to the resolution base value 111 (i.e. encoder resolution/resolution base value), while the second operation frequency can be treated as an electric gear ratio. The determination module 14 for receiving the conversional tick value, is to judge if or not the conversional tick value is greater than or equal to the minimal tick value. If the judgment is negative, then a judgment signal J would be transmitted to the calculation module 13. On the other hand, if the judgment is positive, then the calculation module 13 is triggered to forward the conversional tick value, the first operation frequency and the second operation frequency to the command-generating module 15, so that the command-generating module 15 can base on the conversional tick value, the first operation frequency and the second operation frequency to output a control command S.

In the present invention, as the calculation module 13 receives the judgment signal J, then the minimal tick value, the conversional tick value and the second operation frequency are calculated to derive a conversional operation frequency. Further, a conversional resolution ratio can be obtained by calculating the first operation frequency and the conversional operation frequency, and the conversional resolution ratio is provided to the resolution-tick corresponding function 112 for computing a modified tick value. The modified tick value is then transmitted to the command-generating module 15, so as to have the command-generating module 15 to base on the modified tick value, the first operation frequency and the conversional operation frequency to generate the control command S. In the present invention, the calculation module 13 applies the multiplier 131 and the divider 132 to multiply the second operation frequency by the minimal tick value, and to have the corresponding product to be divided by the conversional tick value, so that the conversional operation frequency can be obtained. In addition, the calculation module 13 applies the divider 132 to divide the first operation frequency by the conversional operation frequency so as to obtain the conversional resolution ratio.

Figure 2A:
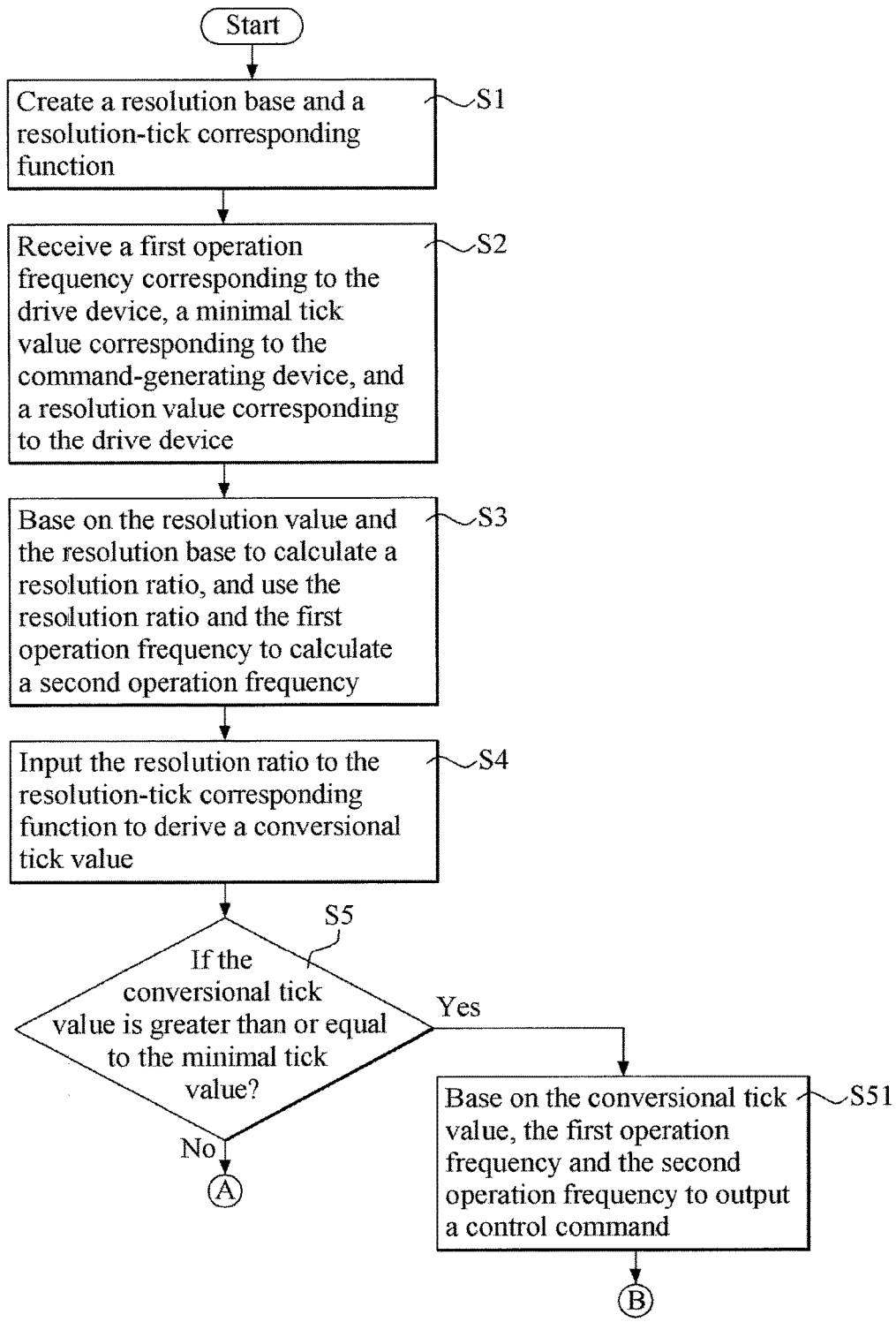
FIG. 2A and FIG. 2B are integrated to show schematically a flowchart of a preferred embodiment of the control-command generating method in accordance with the present invention.
Figure 2B:
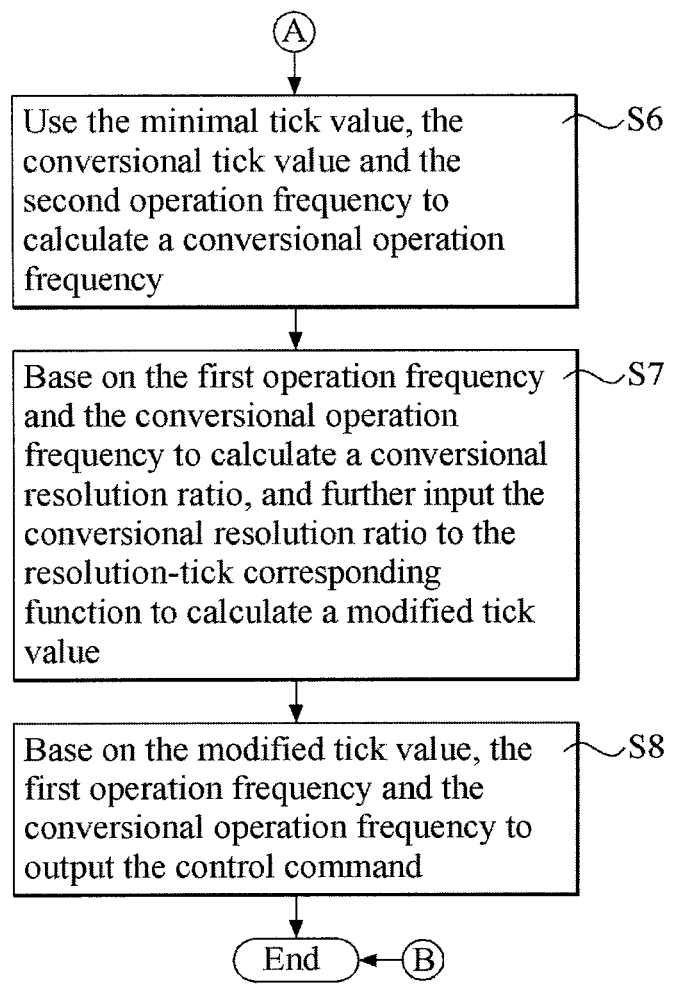

Referring now to FIG. 2A and FIG. 2B together, a flowchart of a preferred embodiment of the control-command generating method in accordance with the present invention is schematically shown. In this embodiment, the control-command generating method is applied to the aforesaid command-generating device 1 of the present invention. The control-command generating method has the command-generating device 1 to generate a control command S, and the control command S is then transmitted to drive the drive device 3 of the motor 2. Firstly, the memory module 11 creates the resolution base value 111 and the resolution-tick corresponding function 112 (Step S1). For example, in this embodiment, the resolution base value 111 can be 10000.

Then, the setup module 12 receives the first operation frequency corresponding to the drive device 3, the minimal tick value corresponding to the command-generating device 1, and a resolution value corresponding to the drive device 3 (Step S2). For example, the minimal tick value can be set to be 10, and the resolution values can be set to be 10000 (with respect to the resolution ratio of 1), 17 bits (with respect to the resolution ratio of 13.1072) or 23 bits (with respect to the resolution ratio of 838.8608), respectively. Then, the calculation module 13 bases on the resolution value and the resolution base value 111 to calculate a corresponding resolution ratio, and further bases on the resolution ratio and the first operation frequency to calculate a corresponding second operation frequency with respect to the command-generating device 1 (Step S3). In this embodiment, the divider 132 is applied to divide the resolution value by the resolution base value 111 so as to generate the corresponding resolution ratio, and to divide the first operation frequency by the resolution ratio so as to generate the corresponding second operation frequency. For example, the first operation frequency is set to be 65536, and the resolution ratio is set to be 1, 13.1072 or 838.8608, respectively. Then, the corresponding second operation frequency would be 65536, 5000 or 78.125, respectively.

Then, the calculation module 13 is applied to input the derived resolution ratio into the resolution-tick corresponding function 112, so that a corresponding conversional tick value can be obtained (Step S4). In this embodiment, the resolution-tick corresponding function 112 is defined as (480000/resolution ratio) for calculating the conversional tick value. Then, the determination module 14 judges whether or not the conversional tick value is greater than or equal to the minimal tick value (Step S5). If the judgment is positive, then the command-generating module 15 would base on the conversional tick value, the first operation frequency and the second operation frequency to output the corresponding control command S to the drive device 3 so as thereby to control the motor 2 (Step S51).

For example, as shown in Table 1, the resolution value can be 10000 or 17 bits, corresponding to the conversional tick value of 160 or 12.2070, respectively. Obviously, each of the two conversional tick values is larger than the minimal tick value, and thus, in either case, the command-generating module 15 would base on the conversional tick value, the corresponding first operation frequency and the corresponding second operation frequency to output the control command S to the drive device 3 for controlling the motor 2.

TABLE 1

| Resolution value | Resolution ratio | Second operation frequency | Conversional tick value |
|---|---|---|---|
| 10000 | 1 | 65536 | 160 |
| 17 bits | 13.1072 | 5000 | 12.2070 |
| 23 bits | 838.8608 | 78.125 | 0.1907 |

On the other hand, if the judgment is negative, then the calculation module 13 would use the minimal tick value, the conversional tick value and the second operation frequency to derive a conversional operation frequency (Step S6). In this embodiment, the divider 132 is applied to divide the minimal tick value by the conversional tick value so as to generate a corresponding calculated ratio, and the multiplier 131 is applied to multiply the second operation frequency by the calculated ratio so as to generate a corresponding conversional operation frequency. However, the present invention are not limited to the aforesaid calculations. For example, in another embodiment of the present invention also shown in Table 1, the resolution value of 23 bits is corresponding to the conversional tick value of 0.1907, which is smaller than the minimal tick value. Thus, the calculation module would divide 10 (the minimal tick value) by 0.1907 (the conversional tick value), and then the result would be multiplied by 78.125 (the corresponding second operation frequency) so as to obtain 4096 (the conversional operation frequency as shown in Table 2).

Thereafter, the calculation module 13 would base on the first operation frequency and the conversional operation frequency to calculate a corresponding conversional resolution ratio, and the conversional resolution ratio is then inputted to the resolution-tick corresponding function 112 so as to calculate a corresponding modified tick value (Step S7). In this embodiment, the divider 132 is applied to divide the first operation frequency by the conversional operation frequency so as to generate a corresponding conversional resolution ratio. For example, as shown in Table 2, 65536 (the first operation frequency) is divided by 4096 (the conversional operation frequency) for generating 16 (the conversional resolution ratio), and 16 (the conversional resolution ratio) is further inputted to the resolution-tick corresponding function 112 so as thereby to obtain 10 (the modified tick value). Finally, the command-generating module 15 would base on the modified tick value, the first operation frequency and the conversional operation frequency to output a corresponding control command S to the drive device 3 for controlling the motor 2 (Step S8).

TABLE 2

| Resolution value | Conversional resolution ratio | Conversional operation frequency | Modified tick value |
|---|---|---|---|
| 23 bits | 16 | 4096 | 10 |

In the method and the device for generating the control command provided by the present invention, the divider is applied to divide the resolution value by the resolution base value so as to generate the corresponding resolution ratio, and the divider is further applied to divide the first operation frequency by the resolution ratio so as thereby to generate the corresponding second operation frequency. Then, the calculation module inputs the resolution ratio to the resolution-tick corresponding function so as to calculate a corresponding conversional tick value. Then, the determination module is introduced to judge whether or not the conversional tick value is greater than or equal to the minimal tick value. If the judgment is positive, then the command-generating module would base on the conversional tick value, the first operation frequency and the second operation frequency to output the corresponding control command to the drive device so as to control the motor.

On the other hand, if the judgment is negative, then the divider is applied to divide the minimal tick value by the conversional tick value so as to generate the calculated ratio, and then the multiplier is applied to multiply the second operation frequency by the calculated ratio so as to generate the conversional operation frequency. Then, the divider is applied again to divide the first operation frequency by the conversional operation frequency so as to generate the conversional resolution ratio. Finally, the command-generating module is applied to base on the modified tick value, the first operation frequency and the conversional operation frequency to output the corresponding control command S to the drive device for controlling the motor.

In comparison to the prior art, the preferred method and the preferred device for generating the control command provided by the present invention apply the multiplier, the divider and the resolution-tick corresponding function to calculate the conversional tick value, and apply the determination module to judge whether or not the conversional tick value is greater than or equal to the minimal tick value. In addition, the calculation module is introduced to calculate the conversional resolution ratio, and the command-generating module is used to output the corresponding control command. Since the present invention provides a method and a device for generating a control command to automatically perform the analysis of control response, thus the conventional human effort upon the functional command generator and the related analysis can be waived. Thereupon, the inevitable engineering errors in the art would be avoided, and the problem in additional maintenance time and labors for debugging would be substantially resolved.

While the present invention has been particularly shown and described with reference to a preferred embodiment, it will be understood by those skilled in the art that various changes in form and detail may be without departing from the spirit and scope of the present invention.

What is claimed is:

1. A control-command generating method, applied to a command-generating device to have the command-generating device to generate a control command and further to transmit the control command to a drive device for driving a motor, the command-generating device including a memory module, a setup module, a calculation module, a determination module and a command-generating module, the control-command generating method comprising the steps of:
(a) the memory module creating a resolution base value and a resolution-tick corresponding function;
(b) the setup module receiving a first operation frequency corresponding to the drive device, a minimal tick value corresponding to the command-generating device, and a resolution value corresponding to the drive device;
(c) the calculation module, based on the resolution value and the resolution base value calculating a resolution ratio, and further based on the resolution ratio and the first operation frequency calculating a second operation frequency corresponding to the command-generating device;
(d) the calculation module inputting the resolution ratio to the resolution-tick corresponding function to derive a conversional tick value;
(e) the determination module judging whether or not the conversional tick value is greater than or equal to the minimal tick value;
(f) if a judgment of the step (e) is negative, the calculation module using the minimal tick value, the conversional tick value and the second operation frequency to calculate a conversional operation frequency;
(g) the calculation module based on the first operation frequency and the conversional operation frequency calculating a conversional resolution ratio, and further inputting the conversional resolution ratio to the resolution-tick corresponding function so as to calculate a modified tick value; and
(h) the command-generating module, based on the modified tick value, the first operation frequency and the conversional operation frequency outputting the control command.

2. The control-command generating method of claim 1, if the judgment of the step (e) is positive, further including a step of the command-generating module, based on the conversional tick value, the first operation frequency and the second operation frequency outputting the control command.

3. The control-command generating method of claim 1, wherein the control command is one of an analog signal and a digital signal.

4. The control-command generating method of claim 1, wherein the resolution-tick corresponding function is an exponential function.

5. The control-command generating method of claim 1, wherein the step (c) is performed by applying a divider to divide the resolution value by the resolution base value so as to generate the resolution ratio and further to divide the first operation frequency by the resolution ratio so as to generate the second operation frequency.

6. The control-command generating method of claim 1, wherein the step (f) is performed by applying a divider to divide the minimal tick value by the conversional tick value so as to generate a calculated ratio, and a multiplier to multiply the second operation frequency by the calculated ratio so as to generate the conversional operation frequency.

7. The control-command generating method of claim 1, wherein the step (g) is performed by applying a divider to divide the first operation frequency by the conversional operation frequency so as to generate the conversional resolution ratio.

8. A command-generating device, for generating a control command further to be transmitted to drive a drive device of a motor, comprising:
a memory module, storing a resolution base value and a resolution-tick corresponding function;
a setup module, receiving and transmitting a first operation frequency corresponding to the drive device, a minimal tick value, and a resolution value corresponding to the drive device;
a calculation module, electrically coupled with the memory module and the setup module, calculating based on the resolution value and the resolution base value a resolution ratio, using the resolution ratio and the first operation frequency to calculate a second operation frequency corresponding to the command-generating device, and inputting the resolution ratio to the resolution-tick corresponding function so as to calculate and further transmit a conversional tick value;
a determination module, electrically coupled with the setup module and the calculation module, receiving the conversional tick value and judging whether or not the conversional tick value is greater than or equal to the minimal tick value; wherein, upon a negative judgment, a judgment signal is transmitted to the calculation module; and
a command-generating module, electrically coupled with the calculation module;
wherein, as the calculation module receives the judgment signal, the minimal tick value, the conversional tick value and the second operation frequency are used to calculate a conversional operation frequency, and the first operation frequency and the conversional operation frequency are used to calculate a conversional resolution ratio further to be inputted to the resolution-tick corresponding function so as to calculate a modified tick value further to be transmitted to the command-generating module, such that the command-generating module can, based on the modified tick value, the first operation frequency and the conversional operation frequency, output the control command.

9. The command-generating device of claim 8, wherein, as the determination module judges that the conversional tick value is greater than or equal to the minimal tick value, the calculation module is triggered to transmit the conversional tick value, the first operation frequency and the second operation frequency to the command-generating module, such that the command-generating module can, based on the conversional tick value, the first operation frequency and the second operation frequency, output the control command.

10. The command-generating device of claim 8, wherein the control command is one of an analog signal and a digital signal.

11. The command-generating device of claim 8, wherein the resolution-tick corresponding function is an exponential function.

12. The command-generating device of claim 8, wherein the calculation module includes at least one of a divider and a multiplier.

* * * * *